(12) United States Patent
Cardona et al.

(10) Patent No.: US 8,413,143 B2
(45) Date of Patent: Apr. 2, 2013

(54) DYNAMIC NETWORK ADAPTER QUEUE PAIR ALLOCATION

(75) Inventors: Omar Cardona, Austin, TX (US);
Jeffrey P Messing, Round Rock, TX (US); Patrick T Vo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/758,305

(22) Filed: Apr. 12, 2010

(65) Prior Publication Data

US 2011/0252419 A1 Oct. 13, 2011

(51) Int. Cl.
*G06F 9/455* (2006.01)
*G06F 3/00* (2006.01)
(52) U.S. Cl. ............................................ 718/1; 719/314
(58) Field of Classification Search ........................ None
See application file for complete search history.

(56) References Cited

U.S. PATENT DOCUMENTS

| 2005/0100033 | A1 | 5/2005 | Arndt et al. | |
|---|---|---|---|---|
| 2007/0159960 | A1 | 7/2007 | Schimke et al. | |
| 2008/0165777 | A1* | 7/2008 | Gainey et al. | 370/392 |
| 2008/0168471 | A1* | 7/2008 | Benner et al. | 719/314 |
| 2009/0006521 | A1 | 1/2009 | Veal et al. | |
| 2009/0037941 | A1 | 2/2009 | Armstrong et al. | |
| 2009/0144383 | A1 | 6/2009 | Elnozahy et al. | |
| 2011/0153935 | A1* | 6/2011 | Li | 711/118 |

* cited by examiner

*Primary Examiner* — Kenneth Tang
(74) *Attorney, Agent, or Firm* — Jonathan E. Jobe

(57) ABSTRACT

A system receives a notification at an operating system image of a change in allocation of queue pair resources to the operating system image. The system queries a physical network adapter through a hypervisor to obtain a new queue pair resource count that will exist in the virtualized system after the change in allocation. The system performs a hashing operation in the operating system image using the new queue pair resource count to distribute transmit traffic among the queue pair resources that will exist in the virtualized system after the change in allocation.

4 Claims, 3 Drawing Sheets

DYNAMIC NETWORK ADAPTER QUEUE PAIR ALLOCATION

BACKGROUND

1. Technical Field

The present invention relates generally to the field of virtualized systems, and more particularly to a for dynamically allocating network adapter queue pairs to logical partitions in a virtualized system.

2. Description of the Related Art

Among the current trends in computer technology are increasing numbers of processors in a single computer system and higher Ethernet line speeds. At current high line speeds, information can be supplied to a single processing unit much faster than the unit can handle the information. In order to take increase the efficiency at which information may be handled, technology known as receive side scaling has been developed to provide parallel processing of incoming data streams across multiple central processing units (CPUs).

Generally, receive side scaling enables packets from a single network adapter to be processed in parallel on multiple CPUs while preserving in-order delivery to TCP connections. A receive side scaling component in the network adapter filters the incoming data stream using various hash algorithms into processing engines or queue pairs. Each queue pair comprises a transmit queue and receive queue. The more queue pairs in use, the higher the system performance.

Another current trend is server virtualization, in which multiple virtual machines or logical partitions operate on single host machine. In virtualized systems, the adapter and its physical ports are controlled by a hypervisor or virtualization layer and logical ports are controlled by the logical partition's operating system. Currently, there is no mechanism for reallocating queue pairs among logical partitions without restarting the affected logical partitions.

BRIEF SUMMARY

Embodiments of the present invention provide systems and computer program products that dynamically change an allocation of queue pair resources to an operating system image running in virtualized environment. Embodiments of according to the present invention receive a notification at the operating system image of a change in allocation of queue pair resources to the operating system image. In response to the notification, the system queries a physical network adapter through a hypervisor to obtain a new queue pair resource count that will exist in the virtualized system after the change in allocation. The system performs a hashing operation in the operating system image using the new queue pair resource count to distribute transmit traffic among the queue pair resources that will exist in the virtualized system after the change in allocation.

In some embodiments of the system of the present invention, the change in allocation of queue pairs includes adding at least one new queue pair to the virtualized system. Before performing the hashing operation in the operating system image, the system allocates the at least one new queue pair. The system starts the at least one new queue pair. The system waits for the physical network adapter to perform a hashing operation to distribute receive traffic among the queue pair resources operating after the change in allocation.

In other embodiments of the system of the present invention, the change in allocation of queue pairs includes removing at least one old queue pair from the virtualized system. The operating system image obtains an identifier of the at least one queue pair to be removed. After performing hashing operation, the operating system image stops the at least one old queue pair identified by the identifier. The operating system image waits for the physical network adapter to perform a hashing operation to distribute receive traffic among the queue pair resources operating after the change in allocation. The operating system image then deallocates the at least one old queue pair.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
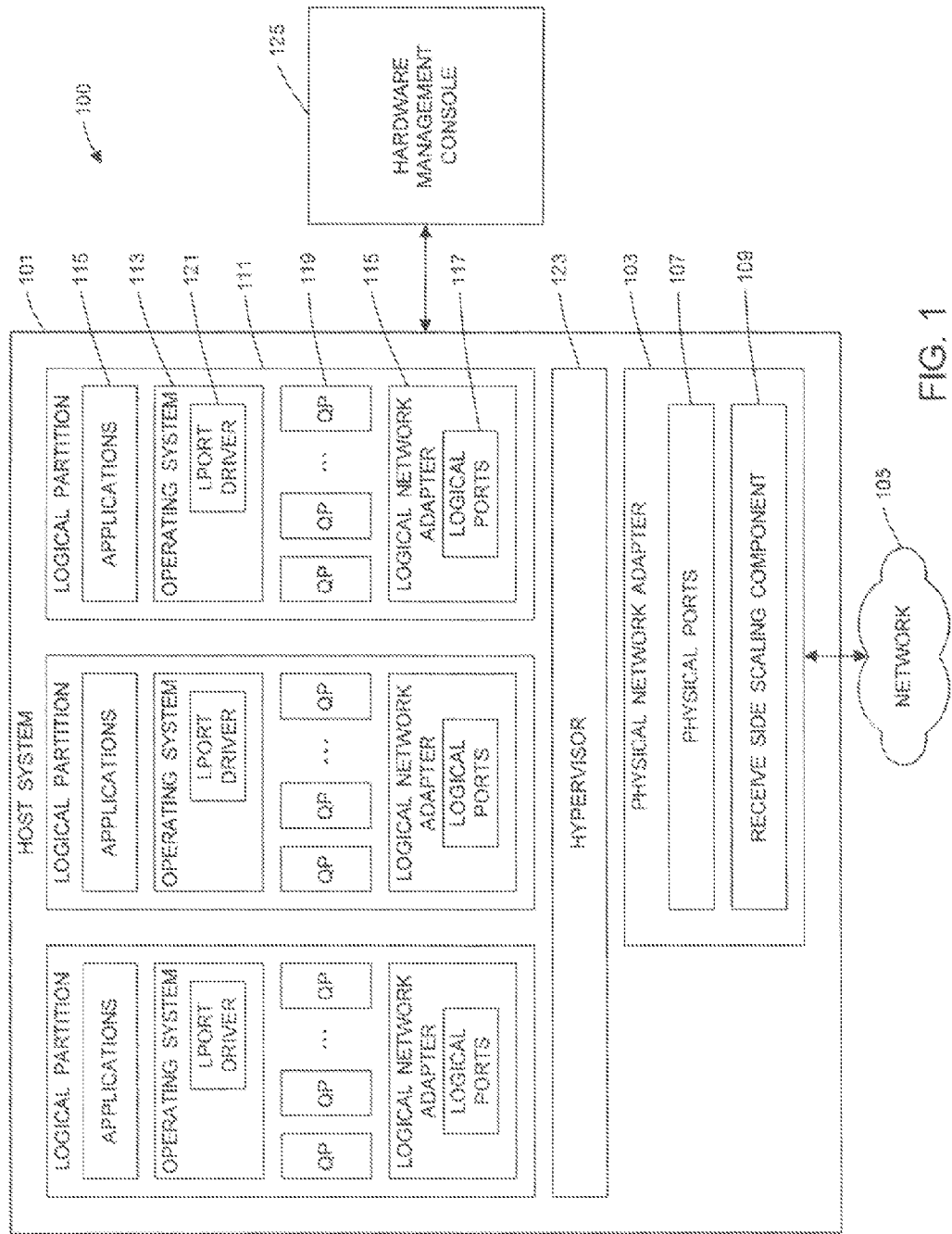
FIG. 1 is a block diagram of an embodiment of a system according to the present invention.

Referring now to drawings, and first to FIG. 1, an embodiment of a system according to the present invention is designated generally by the numeral 100. System 100 includes a host system 101. As is well known to those skilled in the art, host system 101 includes various hardware components, including a physical network adapter 103. Network adapter 103 enables host system 101 to communicate with a network, indicated generally at 105. Network adapter 103 includes one or more physical ports 107 and a receive side scaling component 109.

Host system 101 is virtualized system in that it hosts one or more logical partitions, including logical partition 111. As is known to those skilled in the art, a logical partition is a division of a computer's processor or processors, memory, and input/output devices into multiple a set of resources so that each set of resources can be operated independently with its own operating system instance and application or applications. Thus, logical partition 111 includes an operating system image 43 and one or more applications 115. Logical partition 111 also includes logical or virtual hardware components, including a logical network adapter 115. Logical network adapter 115 includes logical ports 117. Operating system 113 includes multiple virtual device drivers, including a logical port (LPORT) driver 121.

Logical partition 111 includes one or more processing engines or queue pairs (QP) 119. Each queue pair 119 includes a transmit queue and receive queue (not shown) which transmit packets from and receive packet into protocol stacks (not shown) associated with logical partition 111. As will be described in detail hereinafter, LPORT driver 121 is programmed to allocate and deallocate in memory associated with logical partition 111 queue pairs 119.

Host system 101 includes a hypervisor 123. Hypervisor 123 is a software layer that provides the foundation for virtualization of host system 101. Hypervisor 123 enables the hardware of host system 101 to be divided into the multiple logical partitions, including logical partition 111, and it ensures strong isolation between them. Hypervisor 123 is responsible for dispatching the logical partition workload across the physical processors. Hypervisor 123 also enforces partition security and it can provide inter-partition communication. Hypervisor 123 keeps track of the queue pairs 119, which are identified by queue pair numbers, allocated to each logical partition 111. Hypervisor 123 provides information to LPORT driver 121 of the specific queue pairs to be reallocated dynamically. LPORT driver 121 executes add or delete queue pair actions received from hypervisor 123.

Receive side scaling component 109 of physical network adapter 103 enables packet receive-processing to scale with the number of queue pairs 119 active in host system 101. Receive side scaling component 109 implements a hashing algorithm to direct packets received at physical network adapter 103 to each queue pair 119. A queue pair count, which is the number of queue pairs active in host system 101, is a variable in the hashing algorithm implemented in receive side scaling component 109.

In the illustrated embodiment, system 100 includes a hardware management console 125. Hardware management console 125 is a separate machine that provides hardware control of host system 101. Hardware management console 125 provides logical partition management, dynamic resource allocation, monitoring, power control, and other services to host system 101. As those skilled in the art will recognize, the foregoing functions may alternatively be performed by an integrated virtualization manager (not shown) rather than the separate hardware management console 125.

Figure 2:
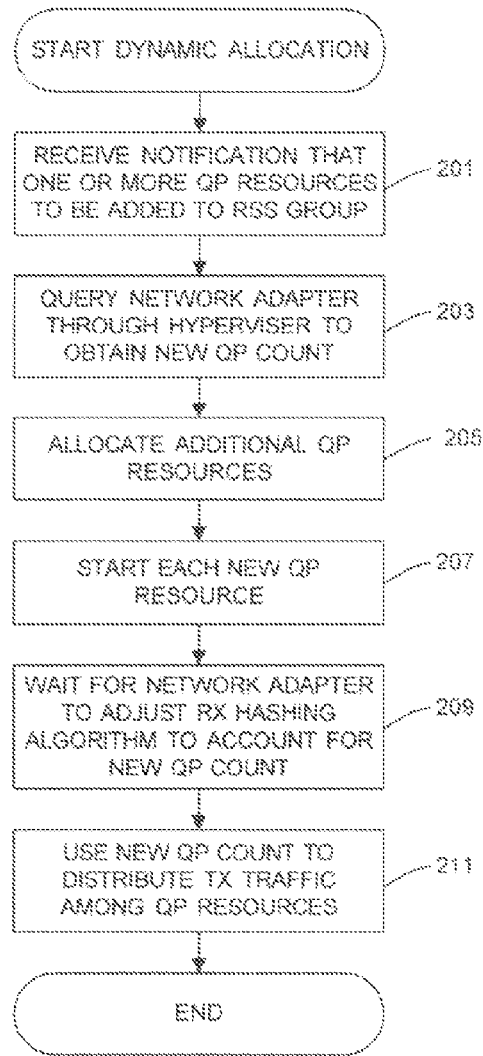
FIG. 2 is a flowchart of an embodiment of dynamic allocation processing according to the present invention.

Embodiments of the present invention enable a system administrator to change number of queue pair resources allocated to a logical partition or operating system image running in virtualized environment dynamically without having to restart to logical partition. Processing according to the present invention may be performed in LPORT driver 121 of an operating system 113. FIG. 2 is a flowchart of an embodiment of dynamic allocation processing. LPORT driver 121 receives a notification from hardware management console 125 that one or more queue pair resources will be added to the receive side scaling group, at block 201. In response to the notification, LPORT driver 121 queries physical network adapter 103 through hypervisor 125 to obtain the new QP count, as indicated at block 203. LPORT driver 121 allocates the new QP resources in memory allocated to its logical partition 111, at block 205. LPORT driver 121 then starts each new QP resource, as indicated at block 207, and waits for receive side scaling component 109 of physical network adapter 103 to adjust its hashing algorithm to account for the new QP count, as indicated at block 209. After receive side scaling component 109 has adjusted its hashing algorithm to account for the new QP count, the LPORT driver 121 uses the new QP count to distribute transmit traffic among its QP resources, as indicated at block 211, by executing the hashing algorithm using the new QP count.

Figure 3:
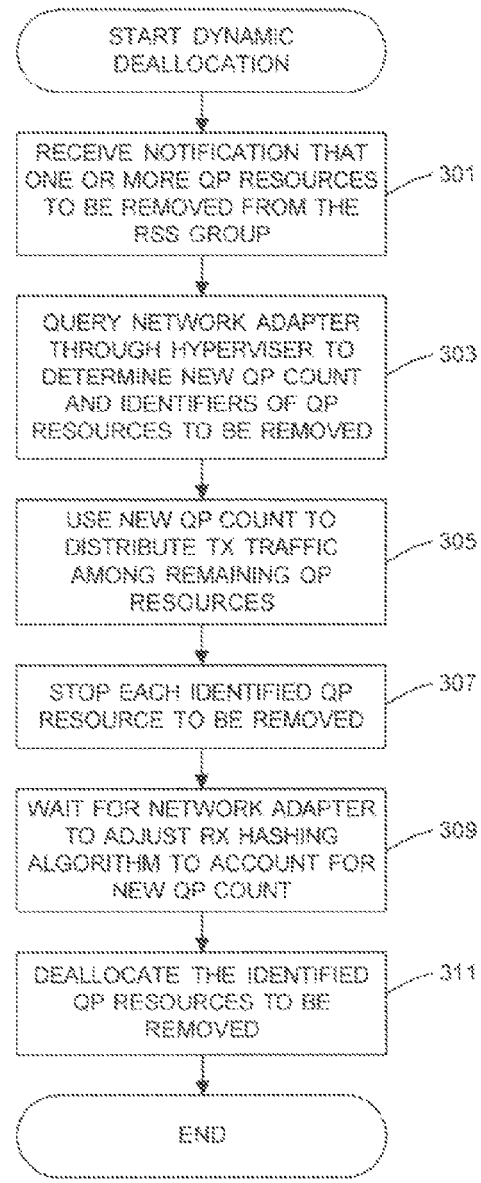
FIG. 3 is a flowchart of an embodiment of dynamic deallocation processing according to the present invention.

FIG. 3 is a flowchart of an embodiment of dynamic deallocation processing. LPORT driver 121 receives a notification from hardware management console 125 that one or more queue pair resources will be removed from the receive side scaling group, at block 301. In response to the notification, LPORT driver 121 queries physical network adapter 103 through hypervisor 125 to obtain the new QP count and the identifiers of the QP resources to be removed, as indicated at block 303. LPORT driver 121 uses the new QP count to distribute transmit traffic among its QP resources, as indicated at block 211, by executing the hashing algorithm using the new QP count as a variable. LPORT driver stops each identified QP resource, at block 307, and waits for receive side scaling component 109 of physical network adapter 103 to adjust its hashing algorithm to account for the new QP count, as indicated at block 309. After receive side scaling component 109 has adjusted its hashing algorithm, LPORT driver 121 deallocates the identified QP resources from memory associated with its logical partition 111.

Figure 4:
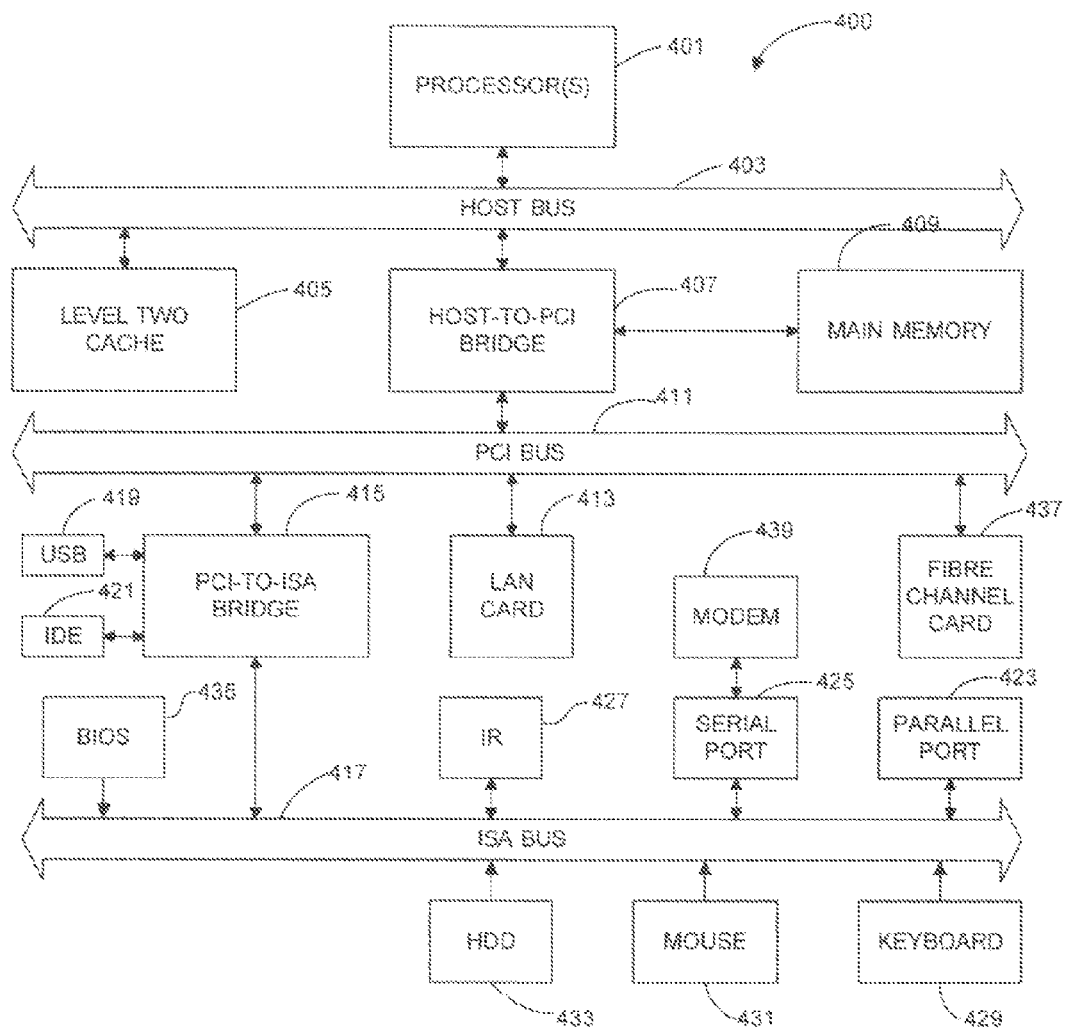
FIG. 4 is a block diagram of an information handling system adapted to practice embodiments of the present invention

Referring now to FIG. 4, there is illustrated a block diagram of a generic information handling system 400 capable of performing the server and client operations described herein. Computer system 400 includes processor 401 which is coupled to host bus 403. Processor 401 preferably includes an onboard cache memory. A level two (L2) cache memory 405 is also coupled to host bus 403. A Host-to-PCI bridge 407 is coupled to host bus 403. Host-to-PCI bridge 407, which is coupled to main memory 409, includes its own cache memory and main memory control functions. Host-to-PCI bridge 407 provides bus control to handle transfers among a PCI bus 411, processor 401, L2 cache 405, main memory 409, and host bus 403. PCI bus 411 provides an interface for a variety of devices including, for example, a local area network (LAN) card 413, a PCI-to-ISA bridge 415, which provides bus control to handle transfers between PCI bus 411 and an ISA bus 417, a universal serial bus (USB) 419, and an IDE device 421. PCI-to-ISA bridge 415 also includes onboard power management functionality. PCI-to-ISA bridge 415 can include other functional elements not shown, such as a real-time clock (RTC), DMA control, interrupt support, and system management bus support.

Peripheral devices and input/output (I/O) devices can be attached to various interfaces or ports coupled to ISA bus 417. Such interfaces or ports may include a parallel port 423, a serial port 425, an infrared (IR) interface 427, a keyboard interface 429, a mouse interface 431, and a hard disk drive (HDD) 433.

A BIOS 435 is coupled to ISA bus 517. BIOS 435 incorporates the necessary processor executable code for a variety of low-level system functions and system boot functions. BIOS 435 can be stored in any computer readable medium, including magnetic storage media, optical storage media, flash memory, random access memory, read only memory, and communications media conveying signals encoding the instructions (e.g., signals from a network). In order to couple computer system 400 to another computer system to copy files or send and receive messages over a network, LAN card 413 may be coupled to PCI bus 411. Similarly, a Fibre Channel card may be coupled to PCI bus 413. Additionally, a modem 439 may be coupled to ISA bus 417 through serial port 425 to support dial-up connections.

While the computer system described in FIG. 11 is capable of executing the invention described herein, the illustrated system is simply one example of a computer system. Those skilled in the art will appreciate that many other computer system designs are capable of performing the invention described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system, which comprises:
a physical network adapter, said network adapter including at least one physical port and a receive side scaling component;
at least one logical partition, said at least one logical partition including an operating system image, said operating system image including a logical port driver, and said at least one logical partition including a logical network adapter;
a hypervisor communicating between said physical network adapter and said logical partition;
wherein said logical adapter includes at least one logical port, said logical port driver including:
program instructions to receive a notification of a change in allocation of queue pair resources to said operating system image by adding at least one new queue pair;
program instructions to query, in response to said notification, said physical network adapter through said hypervisor obtain a new queue pair resource count after said change in allocation;
program instructions to allocate said at least one new queue pair;
program instructions to perform, after allocating said at least one new queue pair, a hashing operation using said new queue pair resource count to distribute transmit traffic among said queue pair resources;
program instruction to start said at least one new queue pair; and,
program instructions to wait for said physical network adapter to perform a hashing operation to distribute receive traffic among said queue pair resources operating after said change in allocation.

2. A computer program product in computer readable storage medium for dynamically changing an allocation of queue pair resources to an operating system image running in virtualized environment, said computer program product comprising:
instructions stored in a computer readable storage medium for receiving a notification of a change in allocation of queue pair resources to said operating system image by adding at least one new queue pair;
instructions stored in said computer readable storage medium for querying said physical network adapter through said hypervisor obtain a new queue pair resource count after said change in allocation in response to said notification;
instructions stored in said computer readable storage medium for allocating said at least one new queue pair;
instructions stored in said computer readable storage medium for performing, after allocating said at least one new queue pair, a hashing operation using said new queue pair resource count to distribute transmit traffic among said queue pair resources;
instructions stored in said computer readable storage medium for starting said at least one new queue pair; and,
instructions stored in said computer readable storage medium for waiting for said physical network adaptor to perform a hashing operation to distribute receive traffic among said queue pair resources operating after said change in allocation.

3. A system, which comprises:
a physical network adapter, said network adapter including at least one physical port and a receive side scaling component;
at least one logical partition, said at least one logical partition including an operating system image, said operating system image including a logical port driver, and said at least one logical partition including a logical network adapter;
a hypervisor communicating between said physical network adapter and said logical partition;
wherein said logical adapter includes at least one logical port, said logical port driver including:
program instructions to receive a notification of a change in allocation of queue pair resources to said operating system image by removing at least one old queue pair;
program instructions to query, in response to said notification, said physical network adapter through said hypervisor obtain a new queue pair resource count after said change in allocation, and an identifier of said at least one queue pair to be removed;
program instructions to perform a hashing operation using said new queue pair resource count to distribute transmit traffic among said queue pair resources;
program instructions to stop said at least one queue pair identified by said identifier after performing said hashing operation;
program instructions to wait for said physical network adapter to perform a hashing operation to distribute receive traffic among said queue pair resources operating after said change in allocation; and,
program instructions to deallocate said at least one old queue pair.

4. A computer program product in computer readable storage medium for dynamically changing an allocation of queue pair resources to an operating system image running in virtualized environment, said computer program product comprising:
instructions stored in a computer readable storage medium for receiving a notification of a change in allocation of queue pair resources to said operating system image by removing at least one old queue pair;
instructions stored in said computer readable storage medium for querying said physical network adapter through said hypervisor obtain a new queue pair resource count after said change in allocation in response to said notification;
instructions stored in said computer readable storage medium for allocating said at least one new queue pair; instructions stored in said computer readable storage medium for querying said physical network adapter through said hypervisor to obtain an identifier of said at least one queue pair to be removed;
instructions stored in said computer readable storage medium for stopping said at least one queue pair identified by said identifier after performing said hashing operation;
instructions stored in said computer readable storage medium for waiting for said physical network adapter to perform a hashing operation to distribute receive traffic among said queue pair resources operating after said change in allocation; and,
instructions stored in said computer readable storage medium for deallocating said at least one old queue pair.

* * * * *